(12) United States Patent
Manohar et al.

(10) Patent No.: US 10,025,532 B2
(45) Date of Patent: Jul. 17, 2018

(54) PRESERVING READ LOOK AHEAD DATA IN AUXILIARY LATCHES

(71) Applicant: SanDisk Technologies Inc., Plano, TX (US)

(72) Inventors: Abhijeet Manohar, Bangalore (IN); Daniel E. Tuers, Kapaa, HI (US); Noga Deshe, Raanana (IL); Vered Kelner, Moshav Gan Haim (IL); Gadi Vishne, Petah Tikva (IL); Nurit Appel, Petach Tikvah (IL); Judah Gamliel Hahn, Ofra (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/928,188

(22) Filed: Oct. 30, 2015

(65) Prior Publication Data

US 2017/0075629 A1    Mar. 16, 2017

(30) Foreign Application Priority Data

Sep. 11, 2015 (IN) .......................... 4837/CHE/2015

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0679; G06F 3/0604
See application file for complete search history.

(56) References Cited

U.S. PATENT DOCUMENTS

| | | | | |
|---|---|---|---|---|
| 5,854,943 A | * | 12/1998 | McBride | G06F 12/0886 710/51 |
| 6,163,501 A | * | 12/2000 | Ohshima | G11C 7/1039 365/189.05 |
| 6,469,955 B1 | * | 10/2002 | Tsao | G11C 7/1042 365/185.17 |
| 6,516,389 B1 | * | 2/2003 | Uchihori | G06F 12/0862 711/113 |
| 7,173,863 B2 | | 2/2007 | Conley et al. | |
| 7,408,834 B2 | | 8/2008 | Conley et al. | |
| 8,634,248 B1 | | 1/2014 | Sprouse et al. | |
| 8,732,406 B1 | * | 5/2014 | Pase | G06F 12/0862 711/113 |
| 8,861,269 B2 | | 10/2014 | Chen et al. | |
| 9,053,820 B2 | | 6/2015 | Chen et al. | |
| 9,431,120 B1 | | 8/2016 | Tuers et al. | |
| 9,678,832 B2 | | 6/2017 | Tuers et al. | |

(Continued)

*Primary Examiner* — Tuan Thai
*Assistant Examiner* — Tasnima Matin
(74) *Attorney, Agent, or Firm* — Brinks Gilson & Lione

(57) ABSTRACT

A storage device utilizing read look ahead (RLA) may utilize auxiliary or spare latches as a RLA cache for storing pre-fetch data. The RLA may predict the next commands and do a speculative read to the flash using the latches for RLA storage. The auxiliary/spare latches may be present on a plane or die of non-volatile memory and may be different from the transfer data latch (XDL) that transfers data from the memory and the host. When the XDL is backed up, sense commands may still be performed and the data is stored in the auxiliary latches before being transferred with the XDL.

20 Claims, 10 Drawing Sheets

(56) References Cited

U.S. PATENT DOCUMENTS

| | | | |
|---|---|---|---|
| 2005/0195636 A1 | 9/2005 | Conley et al. | |
| 2005/0286284 A1* | 12/2005 | See | G11C 16/02 365/63 |
| 2008/0183903 A1* | 7/2008 | VanStee | G06F 13/161 710/5 |
| 2008/0270706 A1* | 10/2008 | Fair | G06F 3/061 711/137 |
| 2010/0306421 A1* | 12/2010 | Maeda | G06F 13/28 710/22 |
| 2013/0279254 A1* | 10/2013 | Kamata | G11C 29/04 365/185.09 |
| 2014/0223073 A1 | 8/2014 | Benisty et al. | |
| 2014/0244864 A1 | 8/2014 | Shiga | |
| 2014/0344505 A1* | 11/2014 | Lim | G06F 12/0246 711/103 |
| 2016/0054931 A1 | 2/2016 | Romanovsky et al. | |
| 2016/0054934 A1 | 2/2016 | Hahn et al. | |
| 2016/0246726 A1 | 8/2016 | Hahn | |

\* cited by examiner

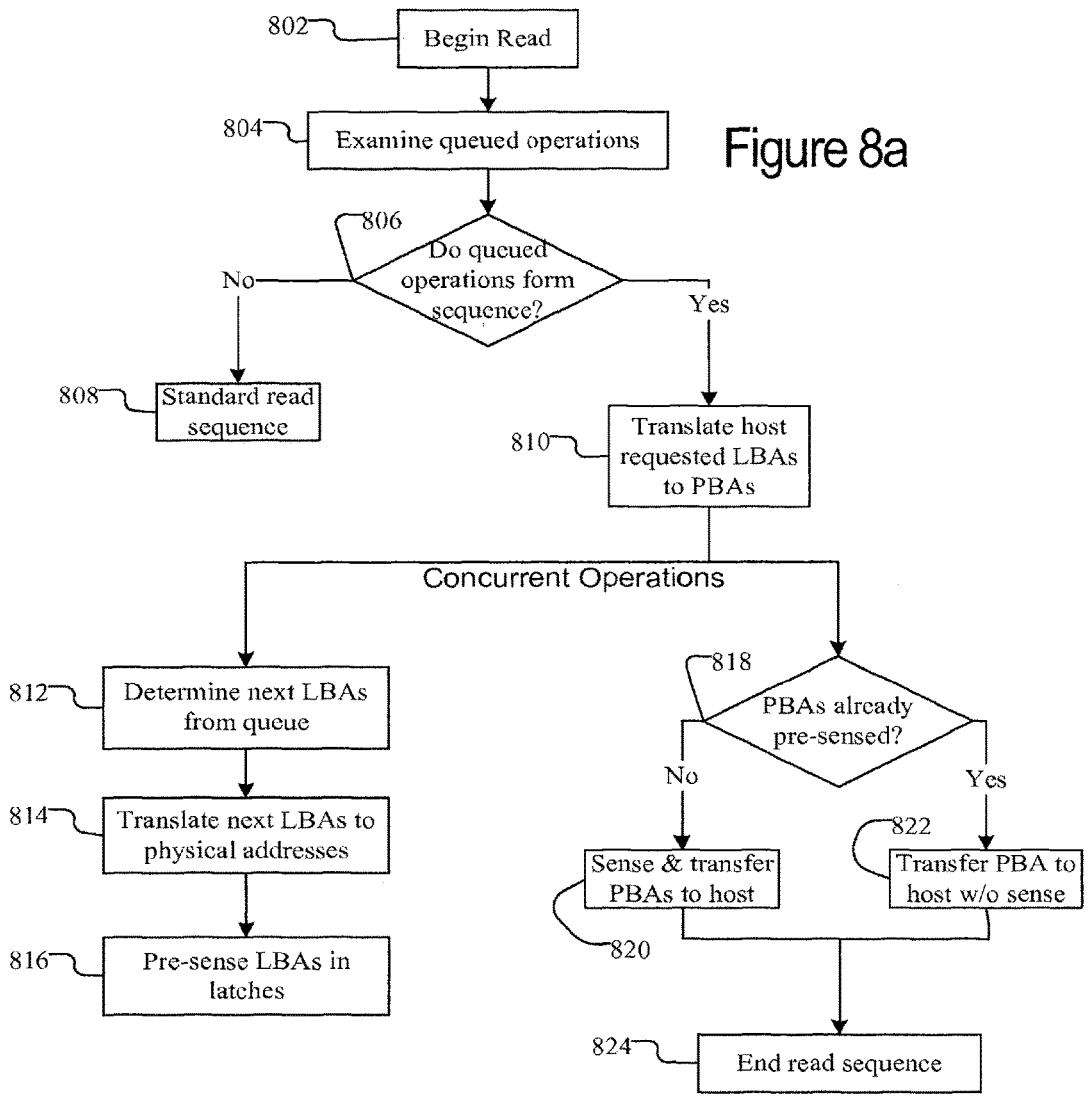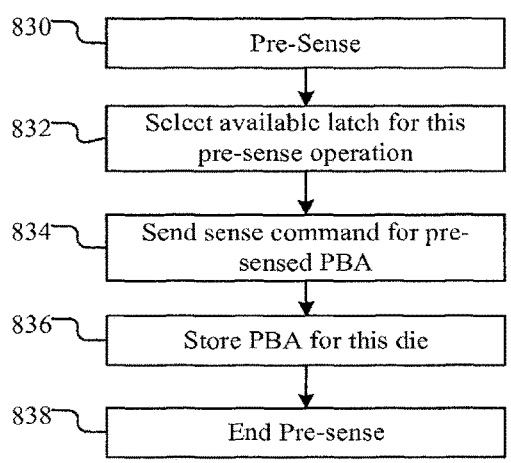

PRESERVING READ LOOK AHEAD DATA IN AUXILIARY LATCHES

PRIORITY

This application claims priority to India Patent Application No. 4837/CHE/2015, filed on Sep. 11, 2015, entitled "PRESERVING READ LOOK AHEAD DATA IN AUXILIARY LATCHES," the entire disclosure of which is herein incorporated by reference.

TECHNICAL FIELD

This application relates generally to memory devices. More specifically, this application relates to utilizing read look ahead (RLA) to store data in auxiliary internal latches for pre-sensing speculative reads to improve efficiency in multi-threaded systems.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. As the non-volatile memory cell scales to smaller dimensions with higher capacity per unit area, the cell endurance due to program and erase cycling, and disturbances (e.g. due to either read or program) may become more prominent. The overall vulnerability of memory cells and the defect level during the silicon process may become elevated as the cell dimension shrinks and process complexity increases, which directly affects the data integrity and performance at both the memory and system. Previously, multi-threaded systems may have utilized host hints or cluster associations to improve performance. Host systems may provide pointers to the next data sets that may be accessed. The pointers may be referred to as host hints. A cluster association may be built in which files are composed of clusters and associated with one another. In previous systems, read look ahead (RLA) may have relied on double data rate (DDR) memory for firmware based read pipelines. The read may pass through DDR on its way to the host. In embodiments with hardware acceleration, RLA may not be possible.

SUMMARY

A storage device utilizing read look ahead (RLA) may utilize auxiliary or spare latches as a RLA cache for storing pre-fetch data. The RLA may predict the next commands and do a speculative read to the flash using the latches for RLA storage. The auxiliary/spare latches may be present on a plane or die of non-volatile memory and may be different from the transfer data latch (XDL) that transfers data from the memory and the host. Using RAM or DDR for the RLA cache may not allow the memory to utilize hardware automation/acceleration techniques, which may provide improved performance. Using the spare/auxiliary latches for the RLA cache allows for hardware automation to be maintained. The sense and transfer components of a read command may be broken up such that a sense command may be performed to read the data and the data is stored in an auxiliary latch until the transfer (from the XDL) is ready.

In one embodiment, a method for pre-fetching data in a memory includes receiving an indication of data that may be subject to a pre-fetch. The pre-fetch data is stored in an auxiliary latch. The method includes waiting for a command for the pre-fetch data and executing the command by moving the pre-fetch data from the auxiliary latch.

In another embodiment, a storage device includes a memory comprising a plurality of die comprising memory blocks. A plurality of latches are on each of the planes and include a transfer data latch (XDL) for transferring data and one or more spare latches. Sequential prediction circuitry predicts requests from a host and includes identifying future read request and identifies pre-fetch data from the future read request. Pre-fetch data storage circuitry uses the spare latches as a cache to store the pre-fetch data before transfer.

In another embodiment, a method includes implementing read look ahead in a memory. The method includes predicting future read requests and fetching data for the predicted future read requests using a pre-sense operation. The data for the predicted future read requests is stored in one or more auxiliary latches. Upon receipt of a read command, the data is transferred from the one or more auxiliary latches.

BRIEF DESCRIPTION OF THE DRAWINGS

FIGS. 8a and 8b are flow charts of the data flow for a pre-sense with multiple latches.

DESCRIPTION OF THE EMBODIMENTS

Host hints and cluster associations may be exploited to perform data pre-fetches. The data pre-fetches may also be referred to as read look ahead (RLA), and may result in reads to different dies or threads. RLA may be a mechanism for anticipating the next command that is going to come from the host which can be used to reduce the turn-around times on multiple commands. RLA may include a speculative read to flash when predicting the logical block address (LBA) range for the next command coming from the host. The detection of a sequence for predicting the next command may be performed by an algorithm that considers sequences (e.g. for a file transfer) or other methods of predicting commands. As described below, when the next commands are identified, a pre-sense is performed and an RLA cache (e.g. spare/auxiliary latches) is used for storing that information rather than relying on random access memory (RAM).

The RLA cache allows data that may be requested by a host to be stored in cache before a request is actually made by the host for that data. As described, the latches (described with respect to FIGS. 3-6) may be used a read look ahead cache. Where a host requests data having a particular logical block address (LBA) range, additional data having a LBA range that is sequential to the requested data may be stored in the latches. Because a host may frequently request data that is logically sequential to the last requested data, there is a higher probability that the stored data will be requested. RLA data may also be selected in other ways based on host data usage patterns. If the latch data is subsequently requested, it may be transferred directly from the latch to the host, such as through the transfer data latch (XDL), but without accessing the memory. This transfer may be quicker than a transfer from the memory and does not require use of the memory bus. Thus, the memory bus may be used for other operations while data is being transferred to the host.

If a random read arrives in the middle of a data pre-fetch, the effort spent on the RLA may be wasted since the pre-fetch data has to be discarded. In order to avoid discarding those pre-fetches, that pre-fetch data may be loaded onto idle or unused latches on a memory plane by moving it from the transfer latch to the spare latches which prevents the RLA data from being lost. Even before the host asks for the data, it may be ready in parallel paths which lead to a boost in performance. The loading of pre-fetch data may be most efficient with mixed traffic loads in a multi-threaded system where the dies may tend to remain idle for a long time because the bus is busy with longer sequential reads/writes. The idle dies may have data that the host anticipates ready to go in the spare latches. That data may be provided once the existing transfer is completed and the host requests that data.

Figure 1A:
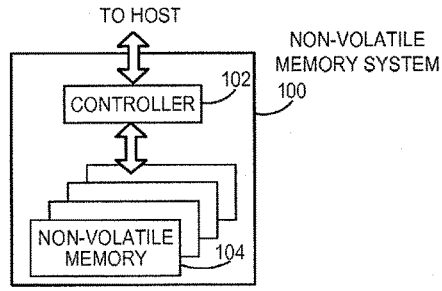
FIG. 1A is a block diagram of an example non-volatile memory system.

FIGS. 1A-2B are exemplary memory systems which may implement using latches as an RLA cache. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

Examples of host systems include, but are not limited to, personal computers (PCs), such as desktop or laptop and other portable computers, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid state disk (SSD) drive installed in a personal computer.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
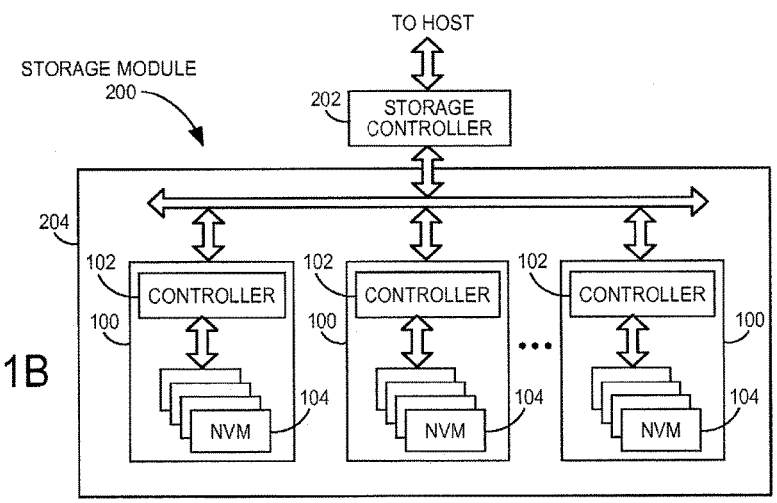
FIG. 1B is a block diagram of a storage module that includes a plurality of non-volatile memory systems.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
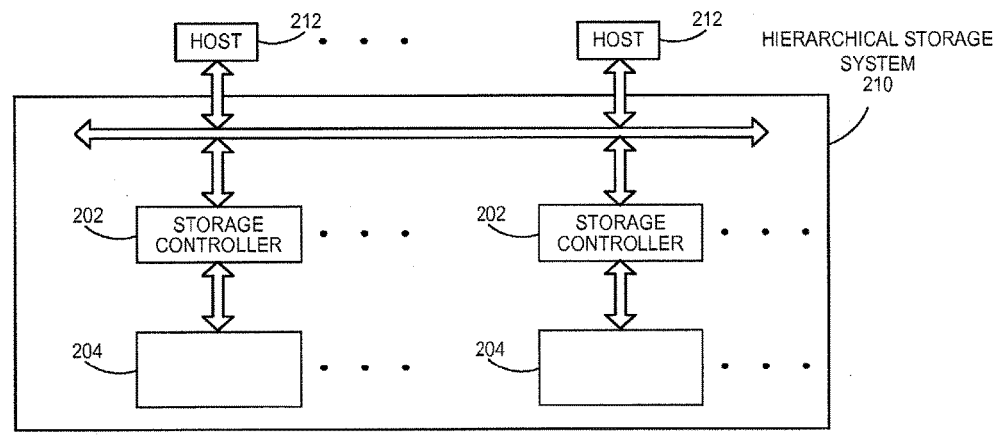
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
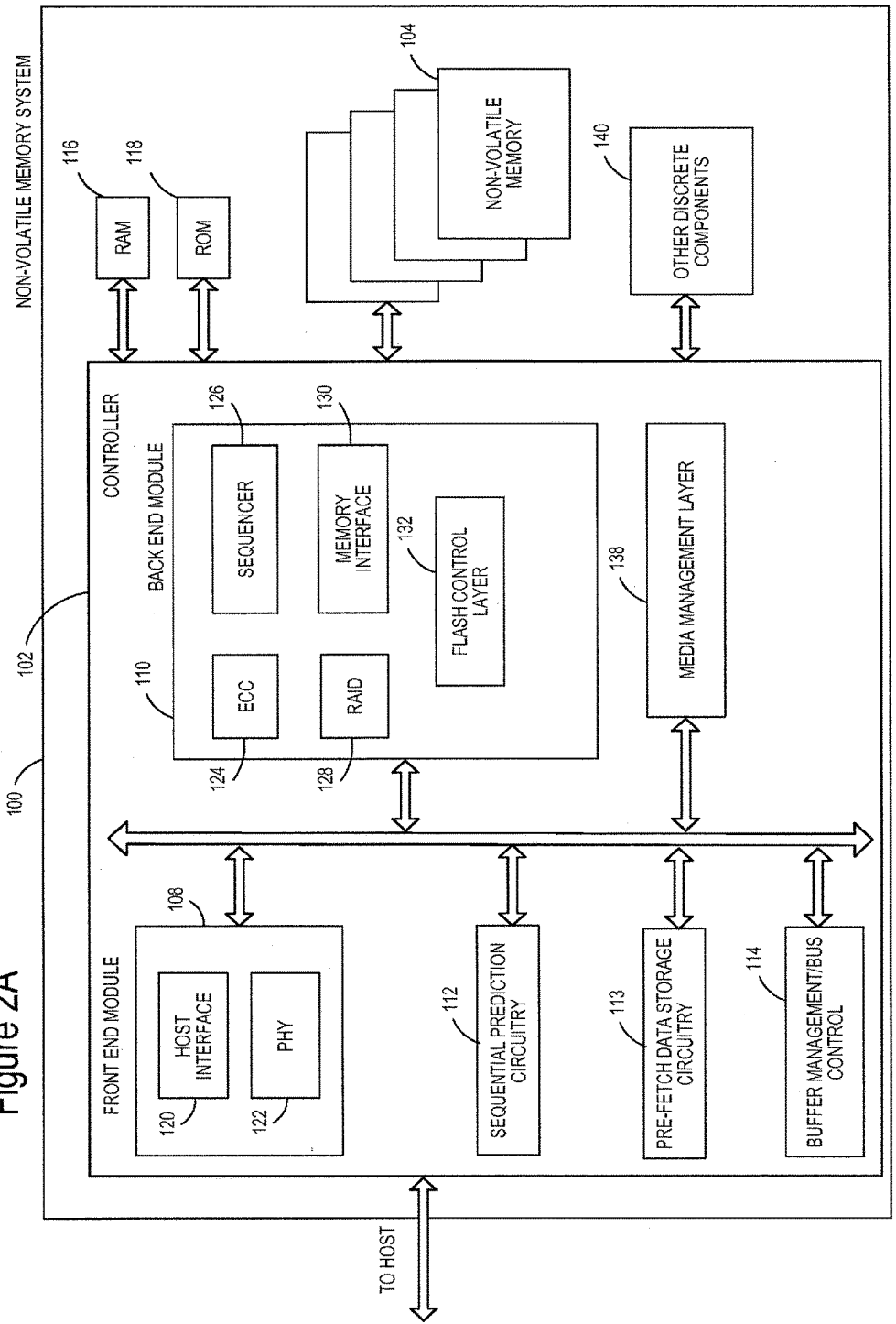
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

The controller 102 may include sequential prediction circuitry 112 and may include pre-fetch data storage circuitry 113. The sequential prediction circuitry 112 may be used for identifying data to be pre-fetched as part of a read look ahead (RLA) process. The sequential prediction circuitry 112 may include an algorithm for identifying a sequence of data such that future data requests may be predicted based on the sequence. In alternative embodiments, the data may not be a sequence, but the sequential prediction circuitry 112 may be able to predict future commands from the host. Based on the predictions from the sequential prediction circuitry 112, the pre-fetch data storage circuitry 113 may pre-fetch for the predicted commands. As described herein, the pre-fetch data storage circuitry 113 may utilize auxiliary latches of the memory for storing the pre-fetched data. The auxiliary latches may not be used otherwise, and storage in the RAM 116 or DDR may not allow the memory to utilize hardware automation techniques. Using hardware automated read paths may provide improved performance that can be maintained when utilizing unused latches for RLA rather than DDR.

Hardware automation may include using a fixed read pipeline that accepts a given set of physical addresses relative to a set of dies. It may deliver the contents directly to host memory using a fixed workflow, which will stop if an error or an unexpected action occurs and then deliver control back to the device firmware. There may be an underlying assumption in a hardware automated pipeline that the data to be delivered to the host is present in non-volatile memory and that a given sequence of commands can be used to retrieve it. Redirection of the workflow to fetch selected data from DDR may require firmware intervention to determine the addresses and manage the volatile memory, and thus it may not be fully automated. Retrieving preloaded data may merely involve changing the sequence sent to the NAND during the read (the preload occurs out of the context of the automated read itself) and thus can still utilize the automated read workflow.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

The FTL or MML 138 may be integrated as part of the flash management that may handle flash errors and interfacing with the host. In particular, MML may be a module in flash management and may be responsible for the internals of NAND management. In particular, the MML 138 may include an algorithm in the memory device firmware which translates writes from the host into writes to the flash memory 104. The MML 138 may be needed because: 1) the flash memory may have limited endurance; 2) the flash memory 104 may only be written in multiples of pages; and/or 3) the flash memory 104 may not be written unless it is erased as a block. The MML 138 understands these potential limitations of the flash memory 104 which may not be visible to the host. Accordingly, the MML 138 attempts to translate the writes from host into writes into the flash memory 104. As described below, erratic bits may be identified and recorded using the MML 138. This recording of erratic bits can be used for evaluating the health of blocks.

Figure 2B:
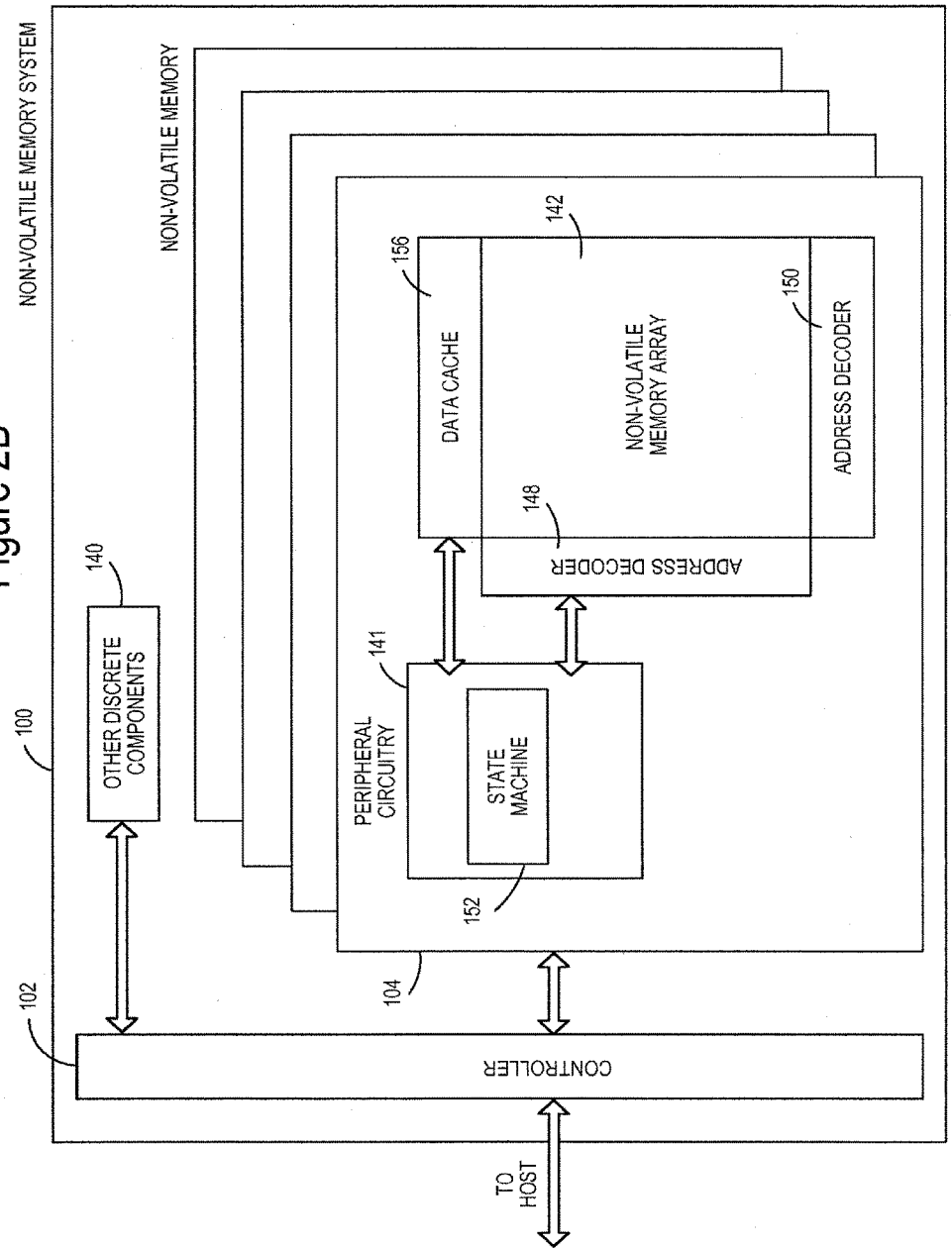
FIG. 2B is a block diagram of exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and may be arranged in planes. In one embodiment, each non-volatile memory die 104 may include one or more planes. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data. Exemplary peripheral circuitry 141 may include clocks, pumps, ESD, current shunt, current sink, and/or closely-packed logic circuits.

Figure 3:
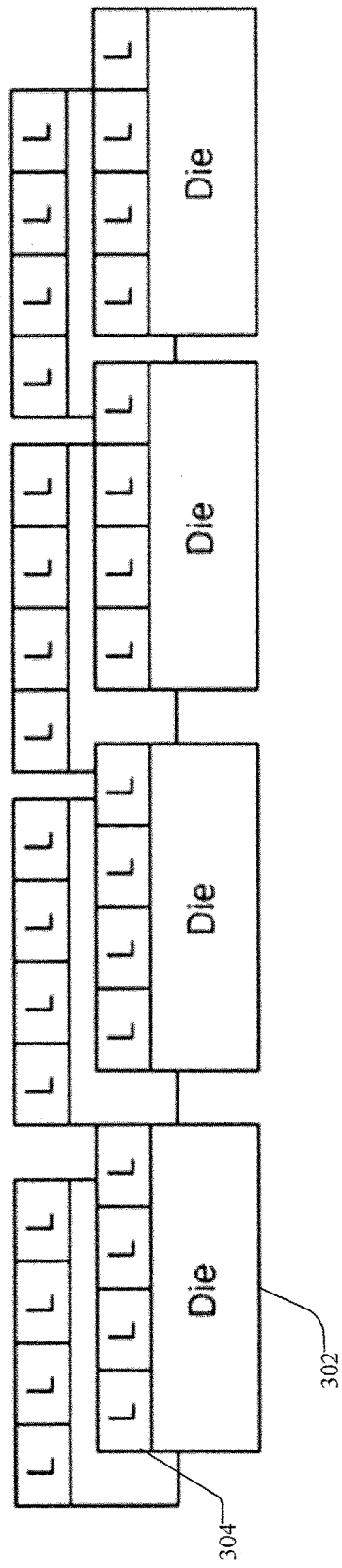
FIG. 3 is a block diagram of exemplary memory die with latches.

The non-volatile memory 104 may include latches for data storage. On example of a latch is a transfer data latch (XDL). FIG. 3 illustrates an exemplary memory die with latches. In particular, FIG. 3 illustrates one embodiment of the non-volatile memory 104 which includes a plurality of die 302. The non-volatile memory may include a plurality of die 302 and include a plurality of planes. There may be latches 304 on each of the die 302 or on each of the planes. The latches 304 may include one transfer data latch XDL and the remaining latches may be auxiliary latches as further discussed with respect to FIG. 4. In one embodiment, there may be one or more planes per each die and there may be one XDL for each plane and one or more auxiliary latches for each plane.

Figure 4:
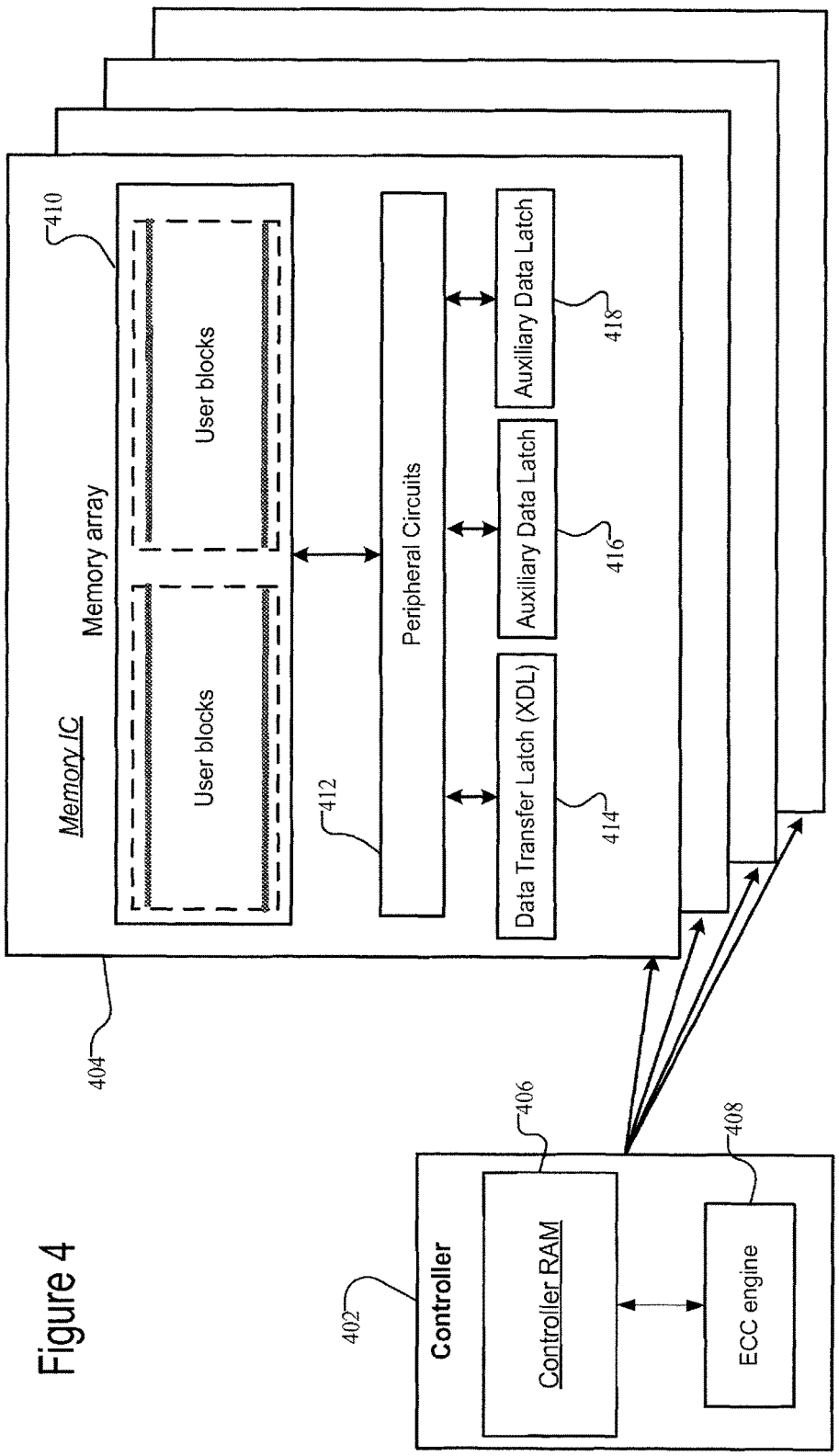
FIG. 4 is a block diagram of an exemplary memory controller and memory array.

FIG. 4 is a block diagram of an exemplary memory controller and memory array. FIG. 4 illustrates a simplified alternative embodiment of the memory system shown in FIGS. 1-2 with latches. The memory controller 402 is coupled with the memory integrated circuit (IC) 404. Although not labeled, there may be a plurality of memory ICs 404 that may correspond to a plurality of dies or a plurality of planes of memory. The controller 402 may include random access memory (RAM) 406 and an error correction code (ECC) engine 408 as discussed in FIG. 2A. The controller 402 may communicate with each of the memory ICs 404 in order to provide host commands (e.g. read/write instructions) and the ECC engine 408 may provide corrections for the data that is read and written. Each of the memory ICs 404 may include a memory array of user blocks 410 and peripheral circuits 412. The peripheral circuits 412 may include the peripheral circuitry 141 shown in FIG. 2B, such as a reading circuit for reading data from the user blocks 412, a programming circuit for programming data to the user blocks 412, and/or a state machine or other logic.

A transfer data latch XDL 414 may communicate with the controller. The transfer data latch XDL 414 may be used data transfer between the host and the memory. The XDL may function as an intermediate data storage between the memory controller and memory. When instructed by the host system to write data to memory, the memory controller writes data to XDL. A programming circuit may write the data from the XDL to the specified memory block and page. In one embodiment, the programming circuit translates the binary representation of data received from the host system into programming voltages and time periods. The programming circuit applies these programming voltages for the programming time periods to memory cells to cause the memory cells to store electric charge. The amount of stored electric charge is representative of the binary representation of the received data. When instructed to read data from a specified memory page, a reading circuit may read data from the specified memory page into the XDL and the memory controller transfers the read data from the XDL to the controller RAM. In one embodiment, the reading circuit translates the amount of charge stored in a memory cell to a binary representation of the data corresponding to the amount of charge stored in the cell. By way of example and without limitation, the reading circuit may include current to voltage convertors, amplifiers and analog to digital convertors.

The memory IC 404 may include one or more auxiliary data latches 416, 418. The auxiliary data latches 416, 418 may typically be used for programming operations, but may be used for storage of pre-fetch data described herein. The auxiliary data latches 416, 418 may be different from the transfer data latch XDL 414 which is used for the transfer of data. As described herein, the auxiliary data latches 416, 418 may be used as part of the RLA process as a storage location for pre-fetch data. The number of auxiliary data latches may vary depending on the memory. In one embodiment, 3 bit per cell memory (X3) may include three auxiliary latches, while 4 bit per cell memory (X4) may include four auxiliary latches.

Generally, data latches store user data, temporary data, or quick pass write data. The transfer data latch XDL may be separated from the other auxiliary data latch circuits, and can receive data asynchronously supplied from the outside. It is the XDL that can transfer data to or from the external bus. In one example, a data latch may be utilized during a write as follows. On the basis of a data input command and a page address, the data is supplied to the XDL. Next, on the basis of a transfer command, the data in the XDL is transferred to other auxiliary data latches before the program command is issued. Similarly, during a read, data from the flash page is read in to the XDL before getting transferred out. In the RLA context, data that is read into the XDL is transferred into the other latches by issuing a transfer command. The controller or firmware may do the transfer and know what data is in which auxiliary latch.

Figure 5A:
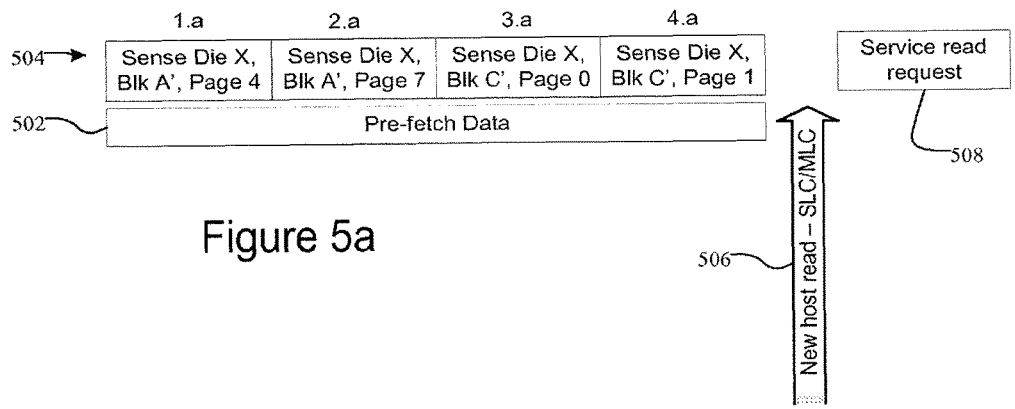
FIGS. 5a, 5b, and 5c are block diagrams illustrating read look ahead (RLA).
Figure 5B:
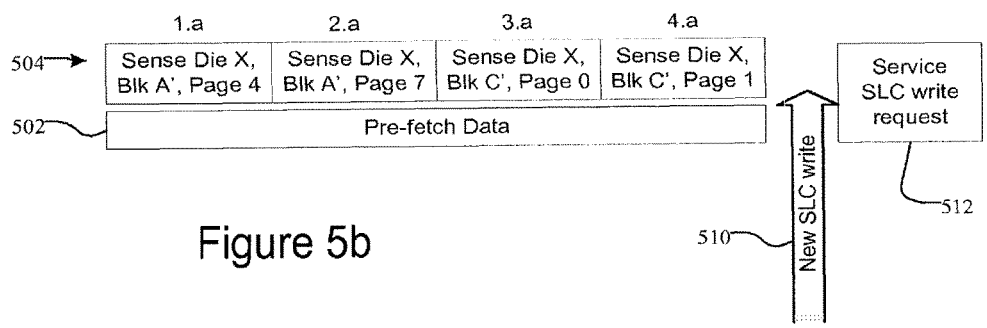
Figure 5C:
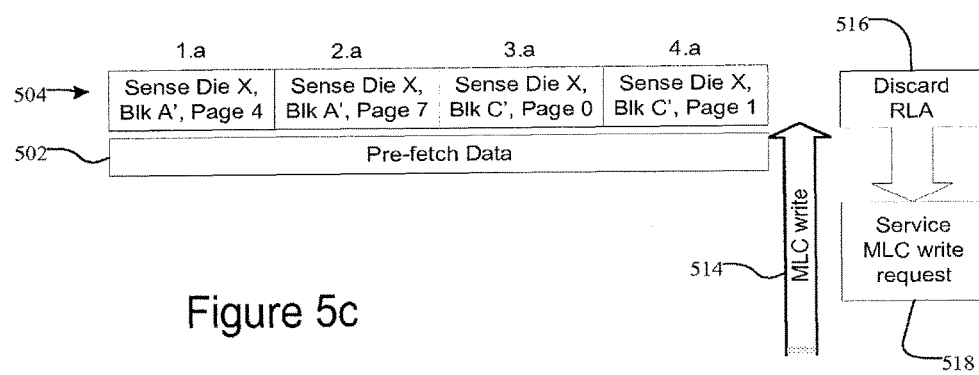

FIGS. 5a, 5b, and 5c are block diagrams illustrating read look ahead (RLA). RLA may also be referred to as a pre-fetch in which data is fetch before it is actually requested based on a prediction or speculation of future requests. Pre-fetch is an exemplary host operation that may be part of the MML 138 in one embodiment. The pre-fetch may include a read look ahead (RLA) so that the host knows what information it wants next. This look ahead may be used to predict the next instruction or command and then to prepare the device to be ready for that instruction or command.

The pre-fetched data 502 may be stored in the auxiliary latches 504 as shown in FIGS. 5a-5c. Once the pre-fetch data 502 is identified, it is packed in the spare latches. FIGS. 5a-5c illustrate four auxiliary latches 504, which is merely exemplary. The auxiliary latches 504 are labeled as 1.a, 2.a, 3.a, and 4.a and are further described with respect to FIG. 6. FIGS. 5a, 5b, and 5c illustrate a sequential flow of receiving commands and the response to those commands. In FIG. 5a, a new host read command 506 is received. The new host read is for single level cell (SLC) or multi-level cell (MLC) memory. In response, the read request is serviced 508. In FIG. 5b, a new write command 510 is received. The write command 510 may be SLC. In response, the write request is serviced 512. In FIG. 5c, a new write command 514 is received. The write command 514 is for MLC memory only. As a result the RLA may be discarded 516, and the MLC write request is serviced 518. Alternatively, the RLA may not be discarded if the write can be routed to another die/plane (as described with respect to FIG. 9). A MLC write request may require more memory than just a single latch. In other words, the auxiliary latch content may be maintained as long as an MLC write does not come in which requires more than one latch. Depending on how many latches are needed, data may be discarded accordingly.

Figure 6:
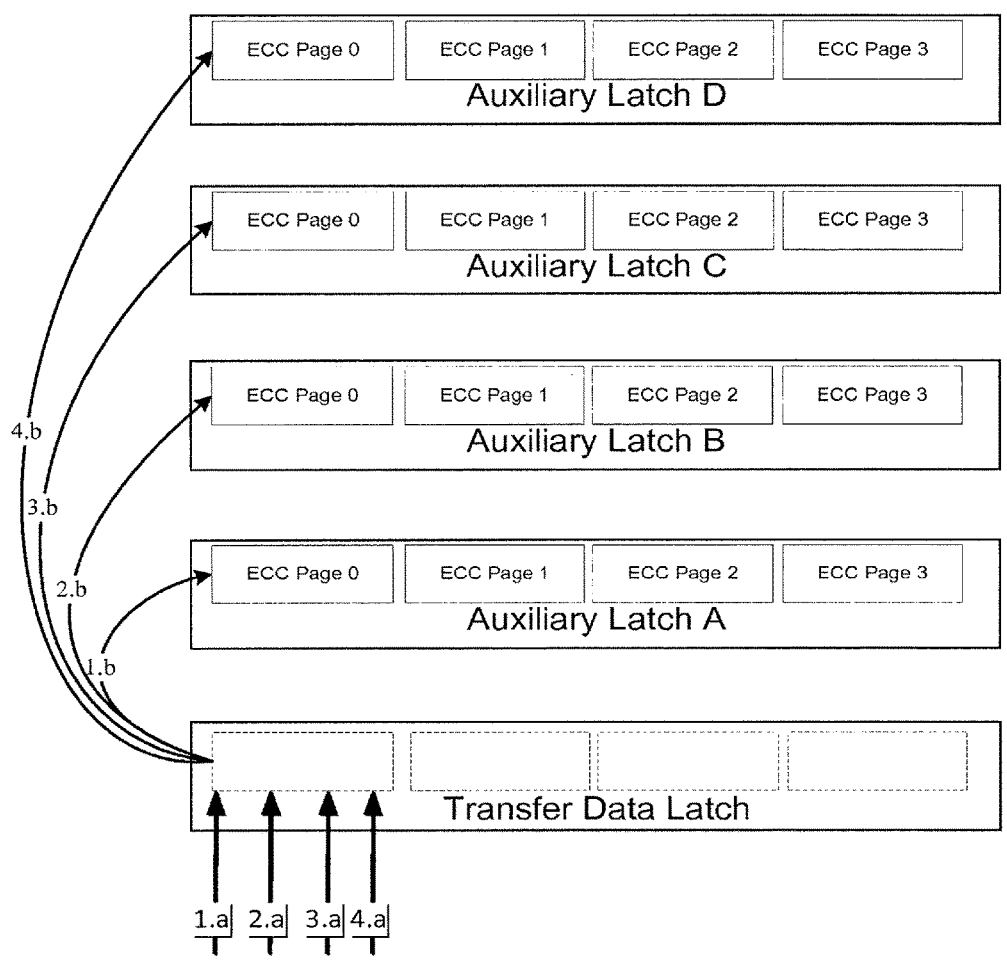
FIG. 6 is a block diagram showing data transfers with auxiliary latches.

FIG. 6 is a block diagram showing data transfers with auxiliary latches. The four commands 1.a, 2.a, 3.a, and 4.a may be received at the transfer data latch XDL. The XDL can then utilize the auxiliary latches as a read look ahead cache. Accordingly, the data is respectively sent to auxiliary latches A-D.

Each latch may be considered to be its own parallel path. FIG. 6 illustrates that the pre-fetched data is readily available in parallel paths and can be sent to the host as soon as the current operation on the bus is complete. This may improve efficiency of the dies and the overall user performance. The writing of data into each of the auxiliary latches form the data transfer latch XDL may be its own parallel process. Conversely, the processing would need to be sequential (sense then transfer, sense then transfer, etc.), but the pre-fetch to the auxiliary latches may be performed in parallel.

The data from the transfer latch (XDL) may be transferred to the auxiliary latches until all of them are packed. The packing may be performed by a simple pad operation in the latches. A start and end column address can be used to pad the XDL around the ECC pages of interest before moving the data to the auxiliary latches. The data received in the transfer latch can be spread out amongst the latches or alternatively maybe just going to one latch. Once the data is sensed, part of it may be transferred to the first latch depending on a size of the data chunk. If the chunk matches the size of the transfer latch the entire data may be transferred to just one of the auxiliary latches.

The (auxiliary/spare/other) latches may be temporary buffers within the memory which can hold data. They may be internal data storage, whereas the transfer data latch XDL can transfer data to and from the outside (e.g. with a host). A read operation includes a sense which pulls data into one of those latches and then a transfer which takes the data from the latch and moves it to the controller. A read operation includes the sense and the transfer. The transfer may be performed with the XDL. As described, if the XDL is backed up, the sense can be performed, but the data can be pushed onto other latches to hold until the XDL is ready for the transfer. In other words, the sense and transfer process are performed separately and the transfer can be delayed by temporarily storing the data that is sensed in the other latches. FIGS. 7-9 illustrate and describe the sense and transfer flow during a RLA operation using auxiliary/spare latches as the RLA cache.

Figure 7A:
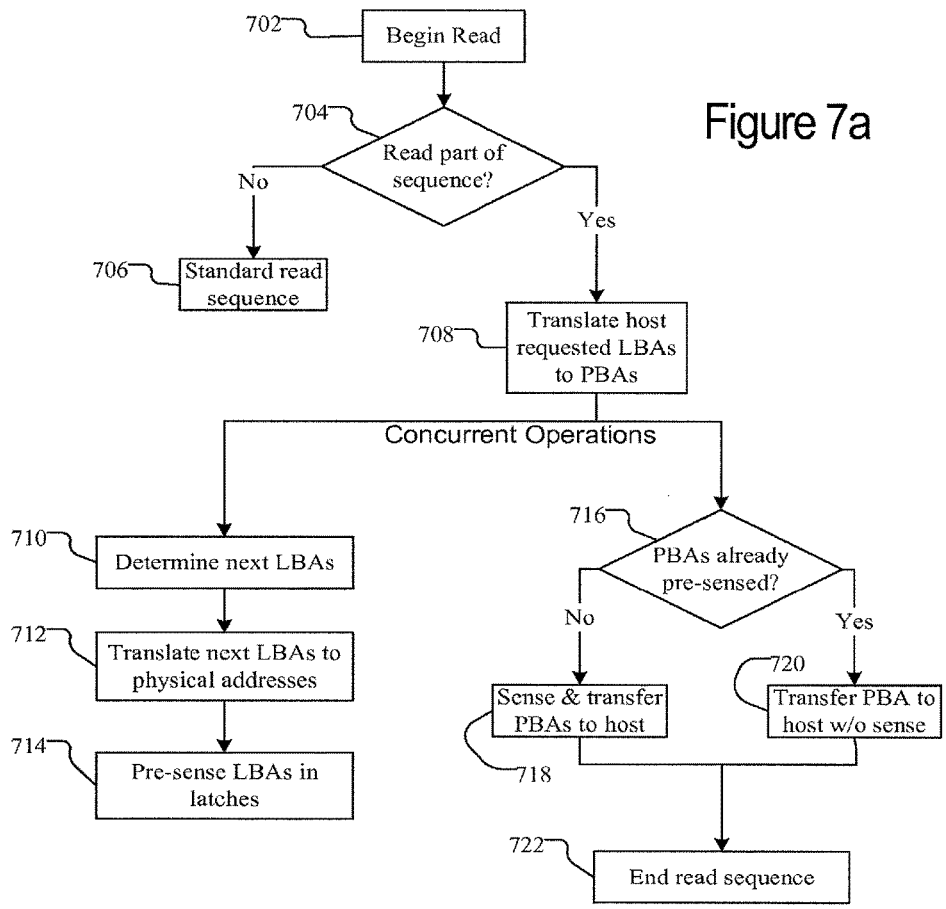
FIGS. 7a and 7b are flow charts of the data flow for a pre-sense.
Figure 7B:
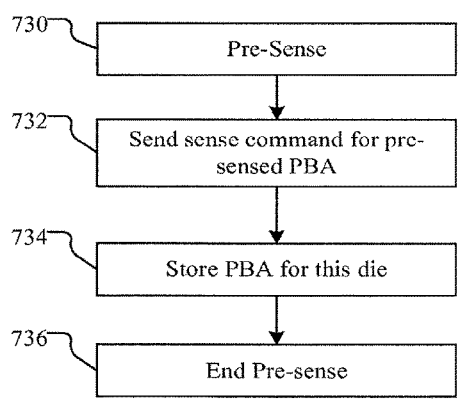

FIGS. 7a and 7b are flow charts of the data flow for a pre-sense. As described, RLA may utilize latches to store pre-fetch data. The commands that are pre-fetched include read commands, which include a sense and transfer. FIGS. 7a-7b illustrate one embodiment in which the sense and transfer functions are separated.

In FIG. 7a, the read begins in block 702 with a read command or instruction from the host. A determination is made as to whether the read is part of a sequence in block 704. In other words, can future commands be predicted for the received command? If not, then the standard read sequence is performed in block 706. If the read can be predicted in block 704, then the host requests logical block addresses (LBAs) are translated to physical block addresses (PBAs) in block 708. The next LBAs are determined (block 710), translated to physical addresses (block 712), and pre-sensed into latches (block 714). This operation may be concurrent with a check to see if the PBAs are already pre-sensed in block 716. If the PBAs are not already pre-sensed, then the sense and transfer of the PBAs to the host is performed in block 718. If the PBAs were already pre-sensed in block 716, then the PBA is transferred to the host without a sense in block 720. The read sequence is ended in block 722. The determinations at blocks 704 and 710 may be performed by a sequential prediction circuitry. The pre-sensing (blocks 714, 716) may be performed by a back end module (e.g. NAND interface). The translation and read (blocks 706, 708, 712) may be part of the MML or flash translation layer. The host may begin the read (block 702) and the host or a host interface may handle the transfer and ending the read sequence (blocks 718, 720, 722).

FIG. 7b illustrates operations of the non-volatile memory or NAND for the pre-sense or read prediction. In FIG. 7b, the pre-sense is began in block 730 with a sense command sent for pre-sensed PBA in block 732. The PBA is stored for the die in block 734 and the pre-sense is ended in block 736.

FIGS. 8a and 8b are flow charts of the data flow for a pre-sense with multiple latches. FIGS. 8a-8b illustrate an alternative embodiment with a multi-latch pre-sense operation. Specifically, the latch being used for as a RLA cache is stored and used for the pre-sense operation.

In FIG. 8a, the read begins in block 802 with a read command or instruction from the host. Operations or commands that have been queued are examined in block 804. A determination is made as to whether the queued operations are part of a sequence in block 806. If the operations are not part of a sequence, then the standard read sequence is performed in block 808. If the read can be predicted in block 806, then the host requested logical block addresses (LBAs) for the current command are translated to physical block addresses (PBAs) in block 810. The next LBAs are determined (block 812), translated to physical addresses (block 814), and pre-sensed into latches (block 816). This operation may be concurrent with a check to see if the PBAs are already pre-sensed in block 818. If the PBAs are not already pre-sensed, then the sense and transfer of the PBAs to the host is performed in block 820. If the PBAs were already pre-sensed in block 816, then the PBA is transferred to the host without a sense in block 822. The read sequence is ended in block 824. The determinations at blocks 804 and 812 may be performed by a sequential prediction circuitry. The pre-sensing (blocks 816, 818) may be performed by a back end module (e.g. NAND interface). The translation and read (blocks 808, 810, 814) may be part of the MML or flash translation layer. The host may begin the read (block 802) and the host or a host interface may handle the transfer and ending the read sequence (blocks 820, 822, 824).

FIG. 8b illustrates operations of the non-volatile memory or NAND for the pre-sense or read prediction. In FIG. 8b, the pre-sense is begins in block 830 with a selection of an available latch for the pre-sense operation in block 832. In a multi-latch environment, the latch to be used for the pre-sense operation may be selected as in block 832. A sense command sent for pre-sensed PBA in block 834. The PBA is stored for the die in block 836 and the pre-sense is ended in block 838.

Figure 9A:
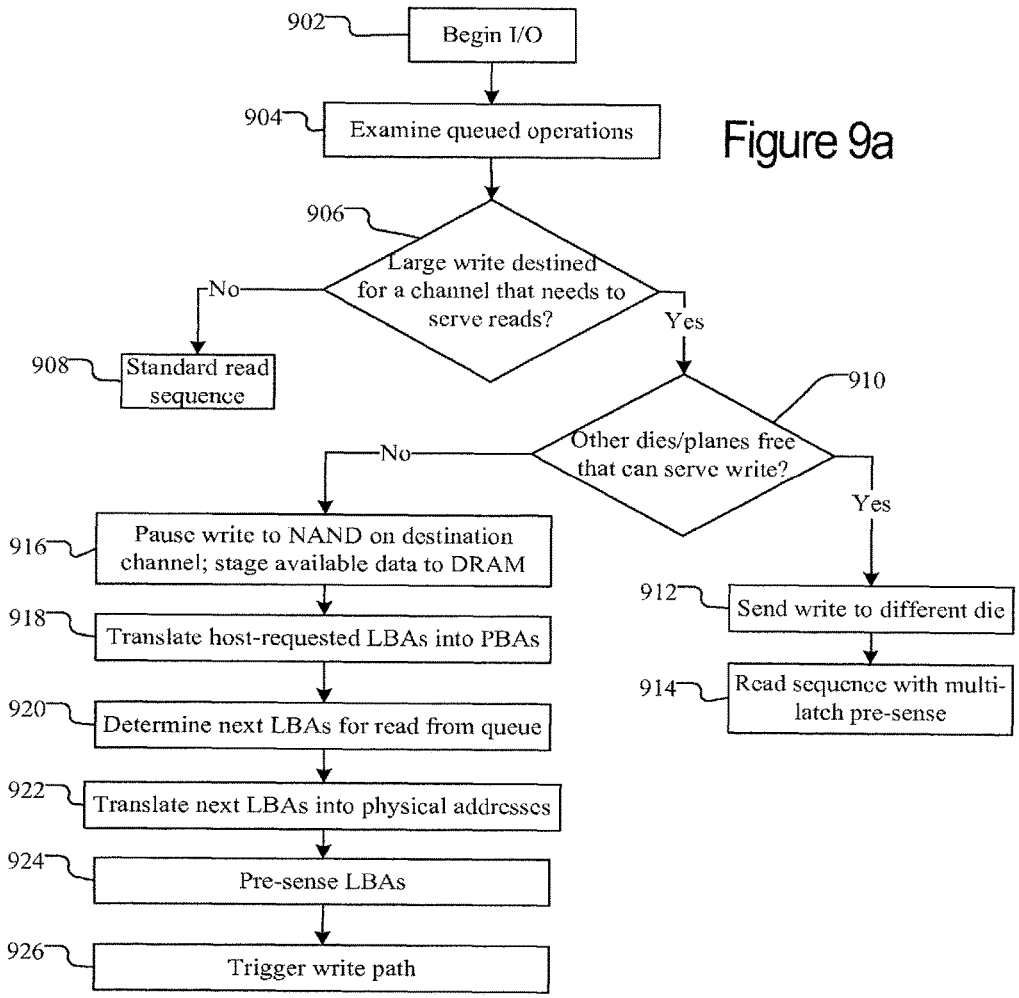
FIGS. 9a and 9b are flow charts of the pre-sense data flow with a mixed workload.
Figure 9B:
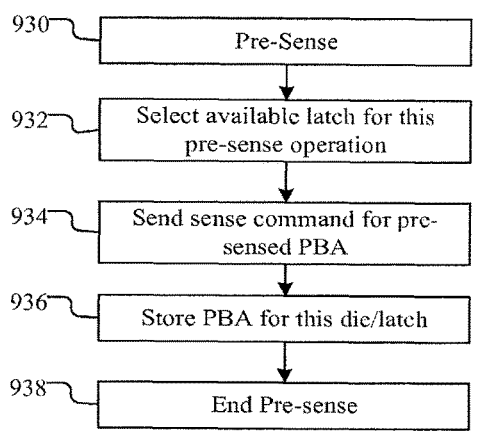

FIGS. 9a and 9b are flow charts of the pre-sense data flow with a mixed workload. In FIG. 9a, a pre-sense in a mixed workload is illustrated. In block 902, the input/output process begins with queued operations being examined in block 904. A determination is made as to whether a large write is destined for a channel that needs to serve reads in block 906. If not, a standard read sequence proceeds in block 908. If a large write is destined for a channel that needs to serve reads, then a check is made as to whether other dies or planes are free to serve the write in block 910. If there is another die/plane that is free to serve the write, then the write is sent to a different die in block 912 and the sequence is read with multi-latch pre-sense in block 914. If there are no other dies/planes that are free to serve the write in block 910, then the write is paused on the destination channel and all available data is staged to DRAM in block 916. Host requested LBAs are translated to PBAs in block 918. The next LBAs for read from the queue are determined in block 920. The next LBAs are translated into physical addresses in block 922. The LBAs are pre-sensed in block 924 and the write path is triggered in block 926.

FIG. 9b illustrates operations of the non-volatile memory or NAND for the pre-sense or read prediction. In FIG. 9b, the pre-sense is begins in block 930 with a selection of an available latch for the pre-sense operation in block 932. In a multi-latch environment, the latch to be used for the pre-sense operation may be selected as in block 932. A sense command sent for pre-sensed PBA in block 934. The PBA is stored for the die in block 936 and the pre-sense is ended in block 938.

If multiple commands are pending for a die and one of them can be fulfilled via RLA, it may be prioritized above the other pending commands. This RLA prioritization may improve performance. If there are multiple read requests pending for the same die and one of them is pre-sensed, then it may be prioritized over the other ones so that it can benefit from the RLA.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

We claim:

1. A method for pre-fetching data, the method comprising:
performing the following in a storage system comprising a controller and a memory die comprising a non-volatile memory, a spare latch, and a transfer data latch (XDL), wherein the non-volatile memory, spare latch, and XDL are in the memory die and not in the controller:
predicting an address to be read from the non-volatile memory;
pre-fetching data from the predicted address in the non-volatile memory and storing the data
in the spare latch in the memory die;
receiving a plurality of read commands, each read command comprising an address;
determining that an address in one of the plurality of read commands matches the predicted address; and
prioritizing the one of the plurality of read commands over other read commands in the plurality of read commands by:
moving the data from the spare latch in the memory die to the XDL in the memory die; and
transferring the data from the XDL in the memory die to the controller.

2. The method of claim 1 transferring the data from the controller to a host.

3. The method of claim 1, wherein the spare latch is configured to temporarily hold the data before the data is moved to the XDL.

4. The method of claim 1, wherein only the XDL can transfer the data out of the memory device.

5. The method of claim 1, wherein the predicted address is predicted from a prior read address.

6. The method of claim 1 wherein the predicting is based on a sequence of data previously requested by a host.

7. The method of claim 1 wherein the non-volatile memory array comprises a three-dimensional memory.

8. A memory die comprising:
a non-volatile memory array;
a transfer data latch ("XDL");
one or more spare latches; and
pre-fetch circuitry configured to pre-fetch data for a future read request from the non-volatile memory array, store the pre-fetched data in the one or more spare latches, receive a plurality of read commands, each read command comprising an address, determine that an address in one of the plurality of read commands matches the predicted address, and prioritizing the one of the plurality of read commands over other read commands in the plurality of read commands by: moving the data from the spare latch in the memory die to the XDL in the memory die; and transferring the data from the XDL in the memory die out of the memory.

9. The memory die of claim 8 further comprising prediction circuitry configured to predict the future read request.

10. The memory die of claim 8, wherein the non-volatile memory array comprises a three-dimensional memory.

11. The memory die of claim 8 wherein the pre-fetch circuitry is configured to store the pre-fetched data in two or more of the spare latches in parallel.

12. A memory system comprising:
a controller; and
a memory die in communication with the controller, wherein the memory die comprises:
a non-volatile memory array;
a data transfer latch (XDL);
one or more auxiliary latches; and
circuitry configured to:
cache, in the one or more auxiliary latches, data from the non-volatile memory array that is predicted to be requested by the controller in the future;
receive a plurality of read commands, each read command comprising an address;
determine that an address in one of the plurality of read commands matches the predicted address; and
prioritize the one of the plurality of read commands over other read commands in the plurality of read commands by:
moving the data from the spare latch in the memory die to the XDL in the memory die; and
transferring the data from the XDL in the memory die y to the controller.

13. The memory system of claim 12, wherein the data is cached by storing the data in two or more of the auxiliary latches in parallel.

14. The memory system of claim 12, wherein only the XDL is configured to transfer data to the controller.

15. The memory system of claim 12, wherein the one or more auxiliary latches comprise a read look ahead cache.

16. The memory system of claim 12, wherein the data predicted to be requested comprises data identified from a data sequence in prior read requests.

17. The memory system of claim 12 further comprising at least one additional memory die, wherein each additional memory die has its own data transfer latch (XDL) and its own one or more auxiliary latches.

18. A memory system comprising:
a memory die comprising a non-volatile memory, a spare latch, and a transfer data latch (XDL);
means for predicting an address to be read from the non-volatile memory;
means for pre-fetching data from the predicted address in the non-volatile memory and storing the data in the spare latch;
means for receiving a plurality of read commands, each read command comprising an address;
means for determining that an address in one of the plurality of read commands matches the predicted address; and
means for prioritizing the one of the plurality of read commands over other read commands in the plurality of read commands by:
moving the data from the spare latch in the memory die to the XDL in the memory die; and
transferring the data from the XDL in the memory die to the controller.

19. The memory system of claim 18 further comprising at least one additional memory die, wherein each additional memory die has its own data transfer latch (XDL) and spare latch.

20. The memory system of claim 18, wherein the non-volatile memory array comprises a three-dimensional memory.

* * * * *